(12) United States Patent
Hirata et al.

(10) Patent No.: US 11,421,778 B2
(45) Date of Patent: Aug. 23, 2022

(54) HYDRAULIC CONTROL DEVICE AND HYDRAULIC CONTROL METHOD FOR AUTOMATIC TRANSMISSION

(71) Applicants: JATCO Ltd, Fuji (JP); NISSAN MOTOR CO., LTD., Yokohama (JP)

(72) Inventors: Shoichi Hirata, Yokohama (JP); Hironori Miyaishi, Sagamihara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/269,866

(22) PCT Filed: Aug. 6, 2019

(86) PCT No.: PCT/JP2019/030852
§ 371 (c)(1),
(2) Date: Feb. 19, 2021

(87) PCT Pub. No.: WO2020/054263
PCT Pub. Date: Mar. 19, 2020

(65) Prior Publication Data
US 2021/0222772 A1     Jul. 22, 2021

(30) Foreign Application Priority Data

Sep. 10, 2018 (JP) .............................. JP2018-168571

(51) Int. Cl.
    *B60W 10/08*      (2006.01)
    *F16H 61/02*      (2006.01)
    (Continued)

(52) U.S. Cl.
CPC ............ *F16H 61/02* (2013.01); *B60W 10/08* (2013.01); *B60K 6/485* (2013.01); *B60K 6/543* (2013.01);
(Continued)

(58) Field of Classification Search
CPC .. F16H 61/02; F16H 59/74; F16H 2061/2823; F16H 61/0021; F16H 61/30;
(Continued)

(56) References Cited

U.S. PATENT DOCUMENTS

2016/0290502 A1* 10/2016 Yamanaka ............ B60W 10/10
2017/0203750 A1    7/2017 Kawamoto
2019/0210605 A1* 7/2019 Ishizuka ................ B60W 10/04

FOREIGN PATENT DOCUMENTS

| JP | 2001-185189 A | 7/2001 |
|----|---------------|--------|
| JP | 2011-073611 A | 4/2011 |
| WO | WO-2016/013238 A1 | 1/2016 |

* cited by examiner

*Primary Examiner* — David J Hlavka
(74) *Attorney, Agent, or Firm* — Foley & Lardner LLP

(57) ABSTRACT

As a driving source, an engine and an assist motor are provided. An engine control module includes a torque assist control unit for controlling the assist motor by a plurality of types of switching patterns having different torque assist levels. A CVT control unit includes a torque assist coordination control unit that, when a torque assist request is input from the torque assist control unit, carries out the control that increases commanded hydraulic pressure so as to increase the hydraulic pressure of hydraulically operated members. When carrying out the control that increases the commanded hydraulic pressure, the torque assist coordination control unit unifies the levels of the commanded hydraulic pressure regardless of the types of the switching patterns.

7 Claims, 7 Drawing Sheets

(51) Int. Cl.
   *B60K 6/485*      (2007.10)
   *B60K 6/543*      (2007.10)
   *F16H 59/74*      (2006.01)
(52) U.S. Cl.
   CPC ....... *B60W 2710/083* (2013.01); *F16H 59/74* (2013.01)
(58) Field of Classification Search
   CPC   F16H 61/662; F16H 61/66272; B60W 10/08; B60W 2710/083; B60W 2710/1077; B60W 10/107; B60K 6/485; B60K 6/543; B60K 6/48
   See application file for complete search history.

D RANGE CONTINUOUSLY VARIABLE SPEED SCHEDULE

AFTER SWITCHING TA AMOUNT

| BEFORE SWITCHING TA AMOUNT | ZERO TA | SMALL TA | LARGE TA |
|---|---|---|---|
| ZERO TA | | (1) | (2) |
| SMALL TA | (3) | | (4) |
| LARGE TA | (5) | (6) | |

COMMANDED HYDRAULIC PRESSURE OUTPUT CHARACTERISTIC

HYDRAULIC CONTROL DEVICE AND HYDRAULIC CONTROL METHOD FOR AUTOMATIC TRANSMISSION

TECHNICAL FIELD

The present invention relates to a hydraulic control device and a hydraulic control method for an automatic transmission to be mounted on a vehicle.

BACKGROUND TECHNOLOGY

Heretofore, there has been know a control device and its control method for a hybrid vehicle in which when the assisting of a motor assist is carried out, before motor torque is increased, secondary pulley pressure (line pressure) is increased to increase the transmission torque capacity of a continuously variable transmission (see, for example, a patent document 1).

However, in the above conventional technique, one type of a motor assist is carried out, and hydraulic control for carrying out two types of small and large assists is not disclosed. In a case where two types of the motor assists are carried out, as patterns for increasing motor torque, three types of patterns of zero→small, zero→large and small-→large must be considered, and consequently, control logic becomes complicated.

The present invention has been made in consideration of such a problem, and an object of the present invention is to simplify the control logic on the transmission hydraulic control side when the coordination control of transmission hydraulic control and torque assist control by an assist motor is carried out.

PRIOR ART REFERENCE

Patent Document

Patent Document 1: International Publication No. 2016/013238

SUMMARY OF THE INVENTION

A hydraulic control device for an automatic transmission of the present invention includes a driving source, an automatic transmission, a driving source controller and a transmission controller.

The driving source controller includes a torque assist control unit for controlling the assist motor via a plurality of types of switching patterns having different torque assist levels.

The transmission controller includes a torque assist coordination control unit for carrying out control that, when a torque assist request is input from the torque assist control unit, increases commanded hydraulic pressure so as to increase the hydraulic pressure of the hydraulically operated members existing in a torque transmission path.

When the control that increases the commanded hydraulic pressure is carried out, the torque assist coordination control unit unifies levels of the commanded hydraulic pressure regardless of the types of the switching patterns.

Consequently, the control logic on the transmission hydraulic control side can be simplified when the coordination control of the transmission hydraulic control and the torque assist control by the assist motor is carried out.

MODE FOR IMPLEMENTING THE INVENTION

Figure 1:
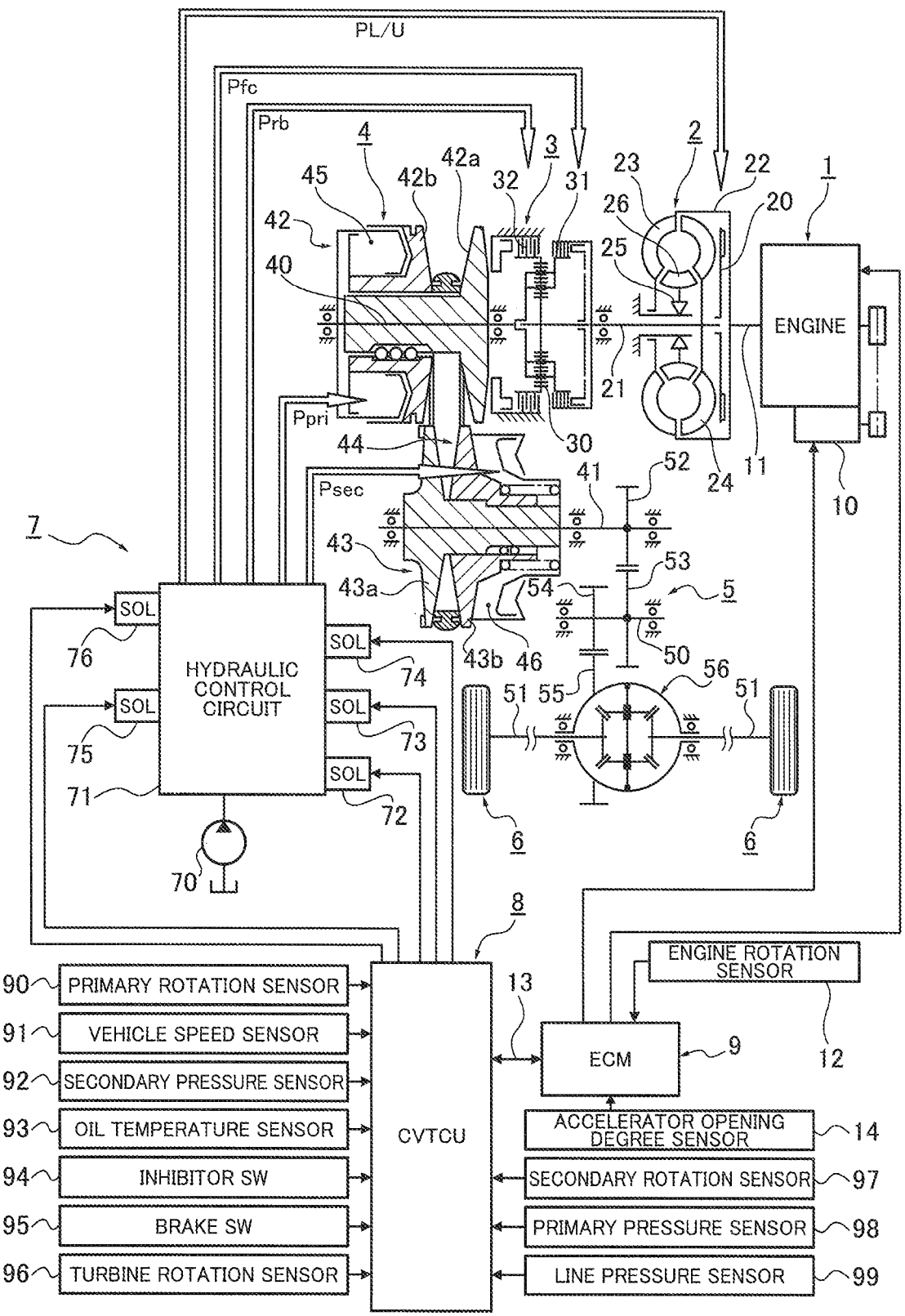
FIG. 1 is an entire system diagram showing a drive system and a control system of an engine vehicle to which a hydraulic control device for a belt type continuously variable transmission of an embodiment is applied.

In the following, a mode for implementing a hydraulic control device for an automatic transmission of the present invention will be explained based on an embodiment shown in the drawings.

The control device in the embodiment is one applied to an engine vehicle equipped with an assist motor which mounts a belt type continuously variable transmission (an example of an automatic transmission) composed of a torque converter, a forward/reverse switching mechanism, a variator and a final reduction gear mechanism. In the following, the configuration of the embodiment will be explained by dividing it into "entire system configuration", "details of configuration of coordination control system" and "torque assist coordination control processing configuration".

[Entire System Configuration]

FIG. 1 shows a control system and a driving system of an engine vehicle to which the control device for a belt type continuously variable transmission of the embodiment is applied. In the following, based on FIG. 1, the entire system configuration will be explained.

As shown in FIG. 1, the driving system of an engine vehicle is provided with an engine 1, a torque converter 2, a forward/reverse switching mechanism 3, a variator 4, a final reduction gear mechanism 5 and drive wheels 6 and 6. Here, a belt type continuously variable transmission CVT is configured by incorporating the torque converter 2, the forward/reverse switching mechanism 3, the variator 4 and the final reduction gear mechanism 5 into a transmission case which is not shown the drawings.

In the engine 1, in addition to the control for output torque by the accelerator operation of a driver, the output torque can be controlled by an engine torque control request from outside, and torque down control by, for example, ignition timing retard control and fuel cut control for stopping fuel injection are carried out. For example, when a torque down request is made from a CVT control unit 8, torque down control for limiting engine torque by upper limit torque is executed. In addition, during coast traveling by foot-off operation, the fuel cut operation is executed.

An assist motor 10 composed of a motor generator having a starter motor function, an engine assist function in a starting region and a regeneration power generation function for charging a battery when a battery charge capacity is low is connected to the crankshaft of the engine 1 via pulleys and belts.

The torque converter 2 is a starting element by a fluid joint which has a torque amplification function and a torque fluctuation absorbing function. The torque converter 2 includes a lock-up clutch 20 which is capable of directly connecting an engine output shaft 11 (torque converter input shaft) with a torque converter output shaft 21 when the torque amplification function and the torque fluctuation absorbing function are not required. The torque converter 2 includes, as constituent elements, a pump impeller 23, a turbine runner 24 and a stator 26. The pump impeller 23 is connected to the engine output shaft 11 via a converter housing 22. The turbine runner 24 is connected to the torque converter output shaft 21. The stator 26 is provided to the transmission case via a one-way clutch 25.

The forward/reverse switching mechanism 3 is a mechanism for switching the input rotation direction to the variator 4 between the normal direction at the time of forward traveling and the reverse direction at the time of backward traveling. The forward/reverse switching mechanism 3 includes a double pinion type planetary gear 30, a forward clutch 31 composed of a plurality of clutch plates and a reverse brake 32 composed of a plurality of brake plates. The forward clutch 31 is hydraulically fastened by a forward clutch pressure Pfc, when a forward traveling range, such as a D range, is selected. The reverse brake 32 is hydraulically fastened by a reverse brake pressure Prb, when a reverse traveling range, such as an R range, is selected. In addition, the forward clutch 31 and the reverse brake 32 are released by the draining of the forward clutch pressure Pfc and the reverse brake pressure Prb, when an N range (neutral range) is selected.

The variator 4 includes a primary pulley 42, a secondary pulley 43 and a pulley belt 44, and has a continuously variable transmission function in which a variable speed ratio (the ratio of the variator input rotation and the variator output rotation) is continuously changed by a change in a belt contact diameter. The primary pulley 42 is composed of a fixed pulley 42a and a slide pulley 42b arranged on the same axis of a variator input shaft 40, and the slide pulley 42b is slidably operated by a primary pressure Ppri to be introduced into a primally pressure chamber 45. The secondary pulley 43 is composed of a fixed pulley 43a and a slide pulley 43b arranged on the same axis of a variator output shaft 41, and the slide pulley 43b is slidably operated by a secondary pressure Psec to be introduced into a secondary chamber 46. The pulley belt 44 is bridged between the V-shaped sheave surface of the primary pulley 42 and the V-shaped sheave surface of the secondary pulley 43. The pulley belt 44 is composed of a pair of laminated rings formed by laminating a plurality of annular rings from the inside to the outside and a plurality of elements which are made from a punched plate material and which are laminated in an annular shape by being sandwiched along a pair of the laminated rings and attached to the laminated rings. In addition, the pulley belt 44 may be a chain type belt in which a plurality of chain elements arranged in a pulley moving direction are joined by pines penetrating in a pulley axial direction.

The final reduction gear mechanism 5 is a mechanism which decelerates the variator output rotation from the variator output shaft 41 and applies a differential function thereto, and then transmits it to the left and right drive wheels 6 and 6. The final reduction gear mechanism 5 includes, as a reduction gear mechanism, an output gear 52 provided to the variator output shaft 41, an idler gear 53 and a reduction gear 54 provided to an idler shaft 50, and a final gear 55 provided at the outer peripheral position of a differential case. Then, as a differential gear mechanism, it includes a differential gear 56 interposed between right and left drive shafts 51 and 51.

As shown in FIG. 1, the control system of an engine vehicle is equipped with a hydraulic control unit 7, a CVT control unit 8 (its abbreviation is "CVTCU") and an engine control module 9 (its abbreviation is "ECM"). The CVT control unit 8 and the engine control module 9 that are electronic control systems are connected to each other by a CAN communication line 13 which is capable of exchanging the information of the CVT control unit 8 and the information of the engine control module 9.

The hydraulic control unit 7 is a unit for regulating the pressure of the primary pressure Ppri to be introduced into the primary pressure chamber 45, the secondary pressure Psec to be introduced into the secondary chamber 46, the forward clutch pressure Pfc for the forward clutch 31 and the reverse brake pressure Prb for the reverse brake 32. The hydraulic control unit 7 is equipped with a hydraulic control circuit 71 for regulating the control pressure of each hydraulically operated member based on the discharge pressure from an oil pump 70. In addition, as the oil pump 70, a mechanical oil pump rotated and driven by the engine 1 may be used singly, or a mechanical oil pump may be used with an electric oil pump.

The hydraulic control circuit 71 includes a line pressure solenoid valve 72, a primary pressure solenoid valve 73, a secondary pressure solenoid valve 74, a select solenoid valve 75 and a lock-up pressure solenoid valve 76. In addition, each of the solenoid valves 72, 73, 74, 75 and 76 carries out pressure regulation action based on control command values (commanded currents) output from the CVT control unit 8.

The line pressure solenoid valve 72 regulates the discharge pressure from the oil pump 70 so as to be a commanded line pressure PL in accordance with a line pressure command value output from the CVT control unit 8. The line pressure PL is an original pressure used at the time when each control pressure is regulated, and is a hydraulic pressure for suppressing belt slipping or clutch slipping to the torque for transmitting the driving system.

The primary pressure solenoid valve 73 carries out the reducing regulation of the control pressure so as to be a commanded primary pressure Ppri using a line pressure PL as an original pressure, in accordance with a primary pressure command value output from the CVT control unit 8. The secondary pressure solenoid valve 74 carries out reducing regulation of the control pressure so as to be a commanded secondary pressure Psec using the line pressure PL as an original pressure in accordance with a secondary pressure command value output from the CVT control unit 8.

The select solenoid valve 75 carries out reducing regulation of the control pressure so as to be a commanded forward clutch pressure Pfc or reverse brake pressure Prb using the line pressure PL as an original pressure in accordance with a forward clutch pressure command value or reverse brake pressure command value output from the CVT control unit 8.

The lock-up pressure solenoid valve 76 carries out reducing regulation of the control pressure so as to be a LU command pressure Plu for fastening/slip-fastening/releasing the lock-up clutch 20, in accordance with a commanded current Alu output from the CVT control unit 8.

The CVT control unit 8 carries out line pressure control, variable speed control, forward/reverse switching control and lock-up control. In the line pressure control, a command value for obtaining a target line pressure in accordance with an accelerator opening degree is output to the line pressure solenoid valve 72. In the variable speed control, when a target variable speed ratio (target primary rotation speed Npri*) is determined, a command value for obtaining the determined target variable speed ratio (target primary rotation speed Npri*) is output to the primary pressure solenoid valve 73 and the secondary pressure solenoid valve 74. In the forward/reverse switching control, a command value for controlling the fastening/releasing of the forward clutch 31 and the reverse brake 32 in accordance with a selected range position is output to the select solenoid valve 75. In the lock-up control, the commanded current Alu for controlling the LU command pressure Plu for fastening/slip-fastening/releasing the lock-up clutch 20 is output to the lock-up pressure solenoid valve 76.

Sensor information and switch information from a primary rotation sensor 90, a vehicle speed sensor 91, a secondary pressure sensor 92, an oil temperature sensor 93, an inhibitor switch 94, a brake switch 95 and a turbine rotation sensor 96 are input to the CVT control unit 8. Moreover, sensor information from a secondary rotation sensor 97, a primary pressure sensor 98 and a line pressure sensor 99 is input to the CVT control unit 8.

Sensor information from an engine rotation sensor 12 and an accelerator opening degree sensor 14 is input to the engine control module 9. The CVT control unit 8 receives the information of an engine speed Ne and an accelerator opening degree APO via the CAN communication line 13, when engine rotation information and accelerator opening degree information are requested to the engine control module 9. Moreover, when engine torque information is requested to the engine control module 9, the CVT control unit 8 receives, via the CAN communication line 13, the information of an actual engine torque Te obtained by estimation calculation in the engine control module 9.

Figure 2:
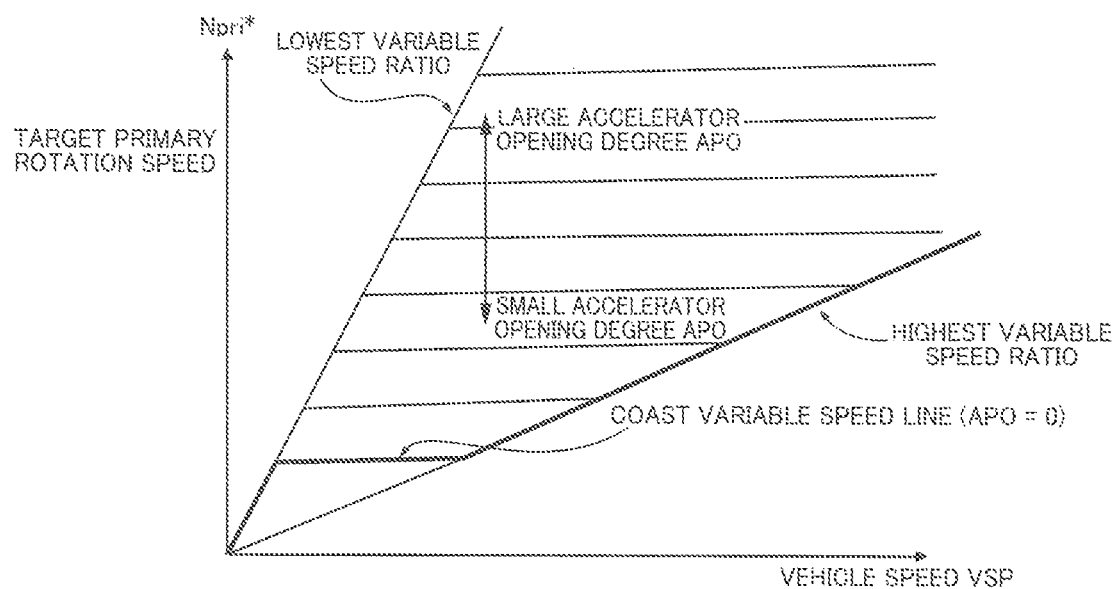
FIG. 2 is a shift schedule table showing an example of a D-range continuously variable speed schedule which is used at the time when continuously variable transmission control in an automatic shift mode is executed by a variator.

FIG. 2 shows an example of a D range continuously variable speed schedule which is used at the time when continuously variable transmission control in an automatic shift mode is executed by the variator 4.

In the variable transmission control when a D range is selected, the target primary rotation speed Npri* is determined by an operation point (VSP, APO) on the D range continuously variable speed schedule of FIG. 2 which is specified by a vehicle speed VSP (vehicle speed sensor 91) and the accelerator opening degree APO (accelerator opening degree sensor 14). Then, feedback control of a pulley oil pressure is carried out so as to match the actual primary rotation speed Npri from the primary rotation sensor 90 with the target primary rotation speed Npri*.

As is clear from the lowest variable speed ratio line and the highest variable speed ratio line of the D range continuously variable speed schedule, the variable speed ratio is shown by inclinations of variable speed ratio lines lined from the zero operation point. Therefore, the determination of the target primary rotation speed Npri* from the operation point (VSP, APO) means the determination of the target variable speed ratio of the variator 4.

That is, as shown in FIG. 2, the D range continuously variable speed schedule is set such that the variable speed ratio is continuously varied within a range of the variable speed ratio range determined by the lowest variable speed ratio and the highest variable speed ratio in accordance with the operation point (VSP, APO). For example, when the vehicle speed VSP is fixed, at the time when accelerator depressing operation is carried out, the target primary rotation speed Npri* arises and the variable speed ratio is varied in the down shift direction, and, at the time when accelerator returning operation is carried out, the target primary rotation speed Npri* is lowered and the variable speed ratio is varied in the up-shift direction. When the accelerator opening degree APO is fixed, at the time when the vehicle speed VSP arises, the variable speed ratio is varied to the up-shift direction, and at the time when the vehicle speed VSP is lowered, it is varied in the down-shift direction.

[Details of Configuration of Coordination Control System]

Figure 3:
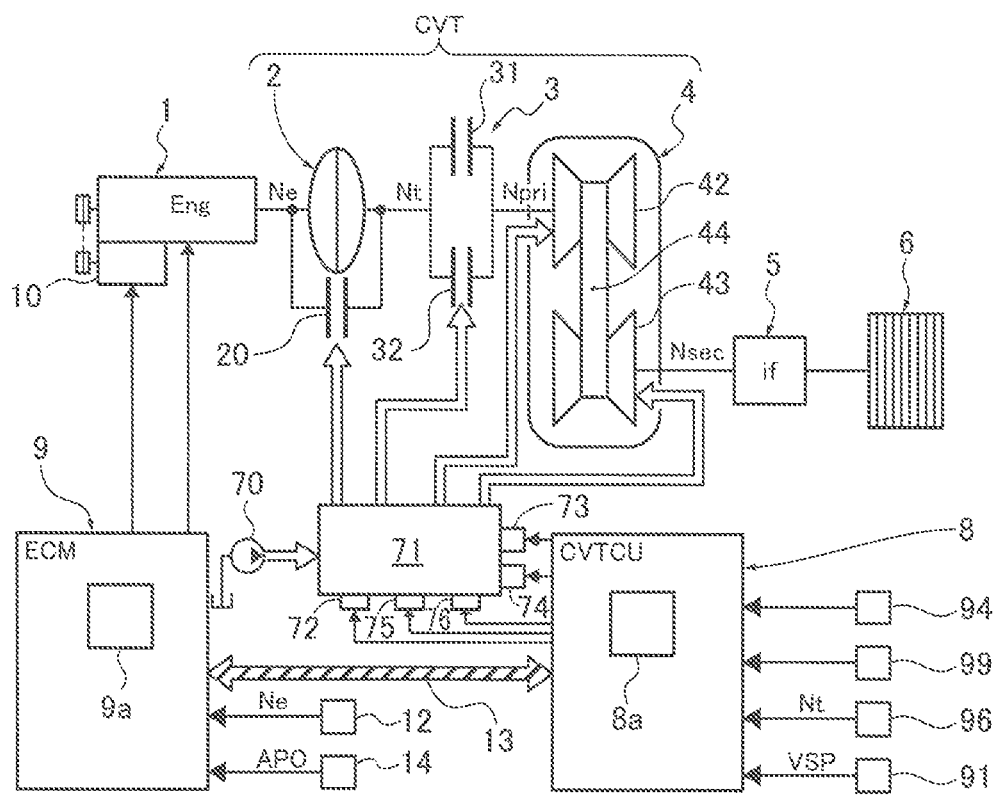
FIG. 3 is a schematic diagram showing a coordination control system of transmission hydraulic control and motor assist control of the embodiment.
Figures 4, 5:
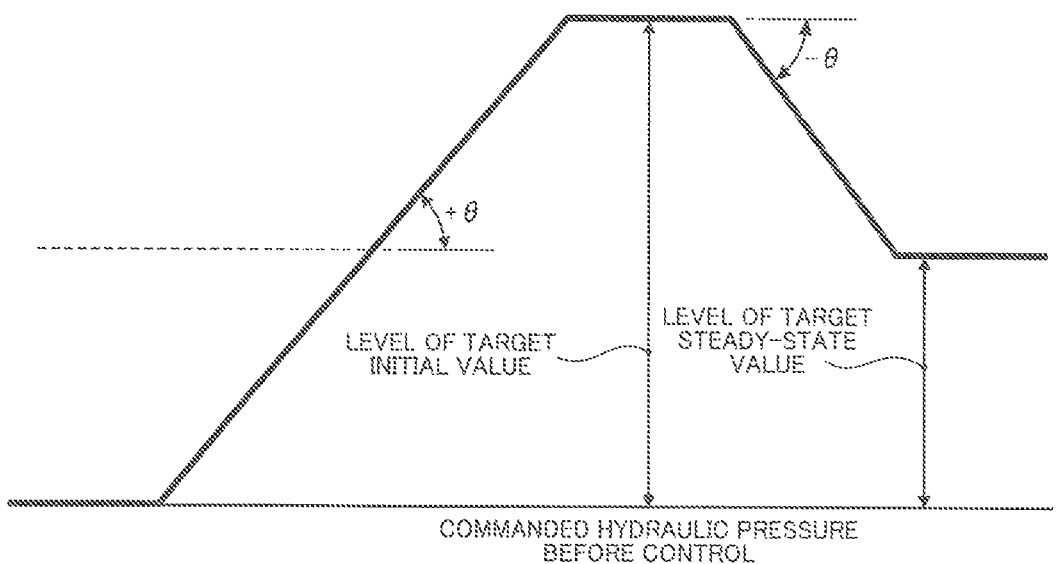
FIG. 4 is drawing showing a switching motion diagram of a torque assist level in torque assist control which is executed by a torque assist control unit of an engine control module.
FIG. 5 is an output characteristic diagram showing an output characteristic unified in hydraulic control for increasing commanded hydraulic pressure which is carried out in a torque assist coordination control unit of a CVT control unit.

FIG. 3 shows the configuration of the coordination control system for motor assist control and transmission hydraulic control of the embodiment. FIG. 4 shows a switching motion diagram of a torque assist level in torque assist control which is executed by a torque assist control unit 9a of an engine control module 9. FIG. 5 shows an output characteristic unified in hydraulic control for increasing a commanded hydraulic pressure which is carried out in a torque assist coordination control unit 8a of a CVT control unit 8. In the following, based on FIG. 3 to FIG. 5, the details of the configuration of the coordination control system will be explained.

The driving system to which the coordination control system is applied is equipped with an engine 1, an assist motor 10, a torque converter 2, a forward/reverse switching mechanism 3, a variator 4, a final reduction gear mechanism 5 and a drive wheel 6. The engine 1 and the assist motor are included in a driving source, and the engine 1 is a main driving source and the assist motor 10 is an auxiliary driving source. The torque converter 2 includes a lock-up clutch 20. The forward/reverse switching mechanism 3 includes a forward clutch 31 and a reverse brake 32. The variator 4 includes a primary pulley 42, a secondary pulley 43 and a pulley belt 44.

Here, hydraulically operated members are hydraulically operated elements such as the lock-up clutch 20, the forward clutch 31, the reverse brake 32, the primary pulley 42 and the secondary pulley 43. Of the hydraulically operated members, during lock-up traveling when a D range is selected, hydraulically operated members existing in a torque transmission path are, for example, the lock-up clutch 20, the forward clutch 31, the primary pulley 42 and the secondary pulley 43.

The hydraulic control system to which the coordination control system is applied is equipped with an oil pump 70, a hydraulic control circuit 71, a line pressure solenoid valve 72, a primary pressure solenoid valve 73, a secondary pressure solenoid valve 74, a select solenoid valve 75 and a lock-up pressure solenoid valve 76.

The electronic control system to which the coordination control system is applied is equipped with a CVT control unit 8 (transmission controller) and an engine control module 9 (driving source controller) which are connected to each other via a CAN communication line 13.

The engine control module 9 controls the engine 1 and the assist motor 10. The engine control module 9 includes a torque assist control unit 9a for controlling the assist motor 10 via a plurality of types of switching patterns having different torque assist levels.

The torque assist control unit 9a executes torque assist control for outputting assist torque for complementing the insufficiency in torque by the assist motor 10, at the time of the starting of a vehicle or at the time when a rapid acceleration is requested in which an engine torque becomes insufficient to a required torque (or request torque). As shown in FIG. 4, the torque assist control unit 9a has two types of torque assists ("TA" is an abbreviation for torque assist) of a small torque assist and a large torque assist used corresponding to a level of the insufficient torque. Then, by three types of switching patterns having different torque change ranges such as (1) zero torque assist→small torque assist, (2) zero torque assist→large torque assist, and (4) small torque assist→large torque assist, the torque assist control for generating the output torque of the engine so as to be large is carried out. In addition, in FIG. 4, the switching patterns of (3) small torque assist→zero torque assist, (5) large torque assist→zero torque assist and (6) large torque assist→small torque assist are torque assist release control patterns for reducing the output torque of the engine 1.

The CVT control unit 8 controls the hydraulic pressure of the hydraulically operated members included in a belt type continuously variable transmission CVT. The CVT control unit 8 includes a torque assist coordination control unit 8a that, when a torque assist request is input from the torque assist control unit 9a, carries out control for increasing commanded hydraulic pressure so as to increase the hydraulic pressure of the hydraulically operated members existing in the torque transmission path. Here, "commanded hydraulic pressure" is commanded current to be output to the line pressure solenoid valve 72. In addition, the term "increasing commanded hydraulic pressure" means to increase, by the commanded current to be output to the line pressure solenoid valve 72, a line pressure PL that becomes an original pressure of a pulley pressure and a clutch pressure. In addition, in a case where the line pressure solenoid valve 72 is a solenoid valve for controlling the hydraulic pressure to be zero when the commanded current is the maximum commanded current and for controlling the hydraulic pressure to be the maximum hydraulic pressure when the commanded current is zero, the term "increasing commanded hydraulic pressure" means to lower the commanded current to be output to the line pressure solenoid valve 72.

When carrying out the control that increases the commanded hydraulic pressure, the torque assist coordination control unit 8a sets the levels of the commanded hydraulic pressure to be uniform regardless of the type of an assist request to be input. When setting the commanded hydraulic pressure levels to be uniform, of the levels of the commanded hydraulic pressure which are set to different levels in accordance with a plurality of respective types of torque assist requests, the levels are unified to the highest commanded hydraulic pressure level.

Here, in the output characteristic of the commanded hydraulic pressure when increasing the commanded hydraulic pressure, as shown in FIG. 5, when a torque assist request is input, the output for increasing the commanded hydraulic pressure is started, and when, after starting the output for increasing the commanded hydraulic pressure, the commanded hydraulic pressure reaches a target initial value, it is maintained. Then, when the assist torque by the assist motor 10 reaches a target torque, the output for reducing the commanded hydraulic pressure is started, and when, after starting the output for reducing the commanded hydraulic pressure, the hydraulic pressure reaches a target steady-state value, it is maintained.

Therefore, "unifying the levels of the commanded hydraulic pressure" means that, based on the commanded hydraulic pressure before the control, the target initial value of the commanded hydraulic pressure is set to a value higher than the target steady-state value of the commanded hydraulic pressure, each of the levels of the target initial value and the target steady-state value (that is, the increased amount of the commanded hydraulic pressure accompanying the torque assist) is set as a fixed value, and the commanded hydraulic pressure output characteristic until the commanded hydraulic pressure is maintained after starting the increasing is unified. That is, each of the levels of the target initial value and the target steady-state value in the commanded hydraulic pressure output characteristic using the commanded hydraulic pressure before the control as a standard is set as a fixed value regardless of the type of a torque assist request, and a gradient absolute value $\theta$ of each of an increasing gradient $+\theta$ and a decreasing gradient $-\theta$ is set to the same gradient angle.

In the torque assist coordination control unit 8a, the section until the actual hydraulic pressure reaches the target hydraulic pressure after the output for increasing the commanded hydraulic pressure is started is set as a preparation section. Then, without inputting a new torque assist request in the middle of the preparation section, the output of the commanded hydraulic pressure by an output pattern based on the input of the first torque assist request is maintained.

[Torque Assist Coordination Control Process]

Figure 6:
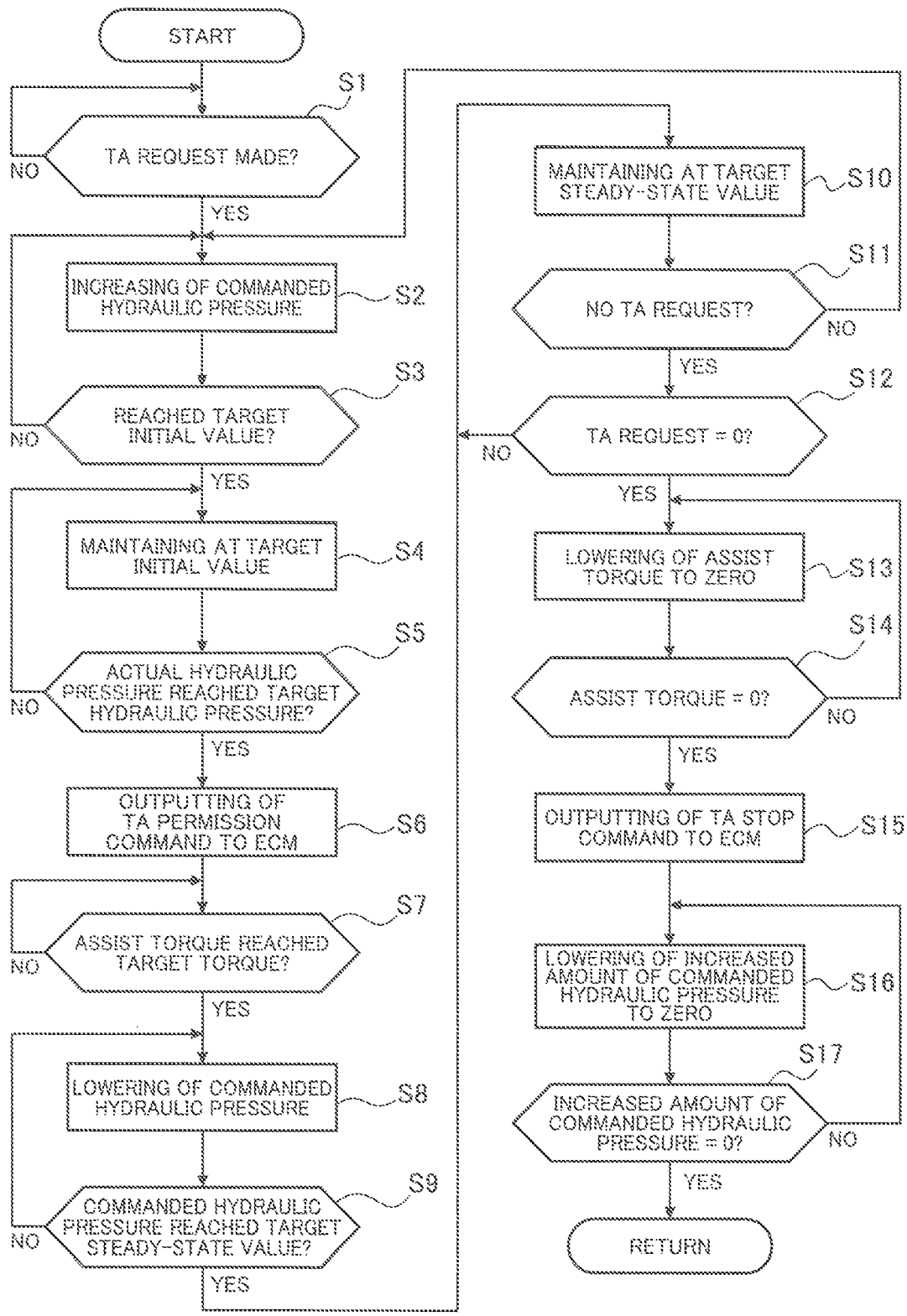
FIG. 6 is a flowchart showing flow of a torque assist coordination control process executed in the torque assist coordination control unit of the CVT control unit of the embodiment.

FIG. 6 shows a flow of a torque assist coordination control process executed in the torque assist coordination control unit 8a of the CVT control unit 8 of the embodiment. In the following, each step of FIG. 6 will be explained.

In a step S1, after the start or when the determination of "NO" is made in the step S1, it is determined whether or not a torque assist request for assisting engine torque is made. In a case where the determination "YES" is made (torque assist request is made), the process proceeds to a step S2, and in a case where the determination of "NO" is made (torque assist request is not made), the determination of the step S1 is repeated.

Here, "torque assist request" is received from the torque assist control unit 9a via the CAN communication line 13. Although the torque assist request has three types of switching patterns having different torque change ranges such as (1) zero torque assist→small torque assist, (2) zero torque assist→large torque assist, and (4) small torque assist→large torque assist, any of the patterns are treated as the same torque assist request.

In the step S2, after the determination of "YES" is made in the step S1 or the determination of "NO" is made in a step S3, the commanded hydraulic pressure is increased at the increasing gradient $+\theta$, and the process proceeds to the step S3.

Following the step S2, in the step S3, it is determined whether or not the commanded hydraulic pressure is increased and reaches the target initial value. In a case where the determination of "YES" is made (the commanded hydraulic pressure reaches the target initial value), the process proceeds to a step S4, and in a case where the determination of "NO" is made (the commanded hydraulic pressure does not reach the target initial value), the process is returned to the step S2.

After the determination of "YES" is made in the step S3 or the determination of "NO" is made in a step S5, in the step S4, the commanded hydraulic pressure is maintained at the target initial value, and then the process proceeds to the step S5.

Following the step S4, in the step S5, it is determined whether or not the actual hydraulic pressure reaches the target hydraulic pressure. In a case where the determination of "YES" is made in the step S5 (the actual hydraulic pressure reaches the target hydraulic pressure), the process proceeds to a step S6, and in a case where the determination of "NO" is made in the step S5 (the actual hydraulic pressure does not reach the target hydraulic pressure), the process is returned to the step S4.

Here, "actual hydraulic pressure" acquires an actual line pressure from the line pressure sensor 99, in a case where the commanded hydraulic pressure to the line pressure solenoid valve 72 is increased.

Following the step S5, in the step S6, a torque assist permission command is output to the torque assist control unit 9a of the engine control module 9 via the CAN communication line 13, and then the process proceeds to a step S7.

Here, "torque assist permission command" is a command for starting, by the assist motor 10, torque assist with three types of switching patterns having different torque change ranges.

Following the step S6 or after the determination of "NO" is made in the step S7, in the step S7, it is determined whether or not the assist torque by the assist motor 10 reaches the target torque. In a case where the determination of "YES" is made in the step S7 (the assist torque reaches the target torque), the process proceeds to a step S8, and in a case where the determination of "NO" is made in the step S7 (the assist torque does not reach the target torque), the determination of the step S7 is repeated.

Here, the information of the assist torque by the assist motor 10 is obtained from the torque assist control unit 9a via the CAN communication line 13.

After the determination of "YES" is made in the step S7 or the determination of "NO" is made in a step S9, in the step S8, the commanded hydraulic pressure is decreased at the decreasing gradient −θ, and then the process proceeds to the step S9.

Following the step 8, in the step S9, it is determined whether or not the commanded hydraulic pressure reaches the target steady-state value. In a case where the determination of "YES" is made in the step S9 (the commanded hydraulic pressure reaches the target steady-state value), the process proceeds to a step S10, and in a case where the determination of "NO" is made in the step S9 (the commanded hydraulic pressure does not reach the target steady-state value), the process is returned to the step S8.

After the determination of "YES" is made in the step S9 or the determination of "NO" is made in a step S12, in the step S10, the commanded hydraulic pressure is maintained at the target steady-state value, and then the process proceeds to a step S11.

Following the step S10, in the step S11, it is determined whether or not no torque assist request is made. In a case where the determination of "YES" is made in the step S11 (no torque assist request), the process proceeds to the step S12, and in a case where the determination of "NO" is made in the step S11 (torque assist request is made), the process is returned to the step S2.

Here, in the determination that a torque assist request is made, the section until the actual hydraulic pressure reaches the target hydraulic pressure after starting the output for increasing the commanded hydraulic pressure is set as a preparation section, and even if a new torque assist request is made in the middle of the preparation section, it is rejected. That is, when a new torque assist request is made after finishing the preparation section, it is determined that a torque assist request is made.

After the determination of "YES" is made in the step S11, in the step S12, it is determined whether or not the torque assist request is zero. In a case where the determination of "YES" is made in the step S12 (torque assist request=0), the process proceeds to a step S13, and in a case where the determination of "NO" is made in the step S12 (the torque assist request is not zero), the process is returned to the step S10.

After the determination of "YES" is made in the step S12 or the determination of "NO" is made in a step S14, in the step 13, the command for decreasing the assist torque by the assist motor 10 to zero is output to the torque assist control unit 9a via the CAN communication line 13, and then the process proceeds to the step S14.

Following the step S13, in the step S14, it is determined whether or not the assist torque becomes zero. In a case where the determination of "YES" is made in the step S14 (assist torque=0), the process proceeds to a step S15, and in a case where the determination of "NO" is made in the step S14 (assist torque>0), the process is returned to the step S13.

Here, the information of the assist torque by the assist motor 10 is obtained from the torque assist control unit 9a via the CAN communication line 13.

After the determination of "YES" is made in the step S14, in the step S15, a torque assist stop command is output to the torque assist control unit 9a of the engine control module 9 via the CAN communication line 13, and then the process proceeds to a step S16.

Following the step S15 or after the determination of "NO" is made in the step 17, the increased amount of the commanded hydraulic pressure is decreased to zero (in other words, to the commanded hydraulic pressure before the control), and the process proceeds to a step S17.

Following the step S16, in the step S17, it is determined whether or not the increased amount of the commanded hydraulic pressure increase is zero (the increased amount of the commanded hydraulic pressure=0). In a case where the determination of "YES" is made in the step S17 (the increased amount of the commanded hydraulic pressure=0), the process proceeds to the return, and in a case where the determination of "NO" is made in the step S17 (the increased amount of the commanded hydraulic pressure>0), the process is returned to the step S16.

Next, an action of the embodiment will be explained by dividing it into "background technology and problem", "means for solving the problem and problem solving action", and "torque assist coordination control action".

Background Technology and Problem

There has been known a torque assist control technology for improving the fuel economy of an engine by assisting engine torque with the torque assist by an assist motor. In this torque assist control, if the control that increases driving source torque by an assist motor torque is carried out, input torque to a belt type continuously variable transmission is increased, and belt slipping or clutch slipping might occur. If the belt slipping or clutch slipping occurs, there is possibility that motor torque overshoot occurs when the assist motor torque is switched to the engine torque. Therefore, on the belt type continuously variable transmission side, when a torque assist request is input, torque assist coordination control that increases a commanded hydraulic pressure to be output to a lock-up clutch and a forward clutch existing in a torque transmission path is carried out in order to suppress the belt slipping or clutch slipping.

In contrast to this, in the torque assist control on the driving source side, there is a request to carry out the control for the assist motor via a plurality of types of switching patterns having different torque assist levels, in order to finely respond to the level of the shortage of the engine torque to a required torque.

Therefore, in a case of a switching pattern having one torque assist level, torque assist coordination control is carried out which increases a commanded hydraulic pressure in accordance with motor torque overshoot which is expected to occur in one type of a switching pattern. However, in a case of a plurality of types of switching patterns having different torque assist levels, the type of motor torque overshoot expected to occur is different in a plurality of each of types of switching patterns, and there are a plurality of types of ways for increasing the commanded hydraulic pressure.

For example, as shown in FIG. 4, two types of large and small torque assists are used, and, since different types of overshoot are expected to occur in respective three types of switching patterns (1), (2) and (4), there are three ways for increasing hydraulic pressure. One having three ways for increasing the hydraulic pressure is set as a comparative embodiment, and based on FIG. 7 and FIG. 8, a torque assist coordination control action in the comparative embodiment will be explained.

Figure 7:
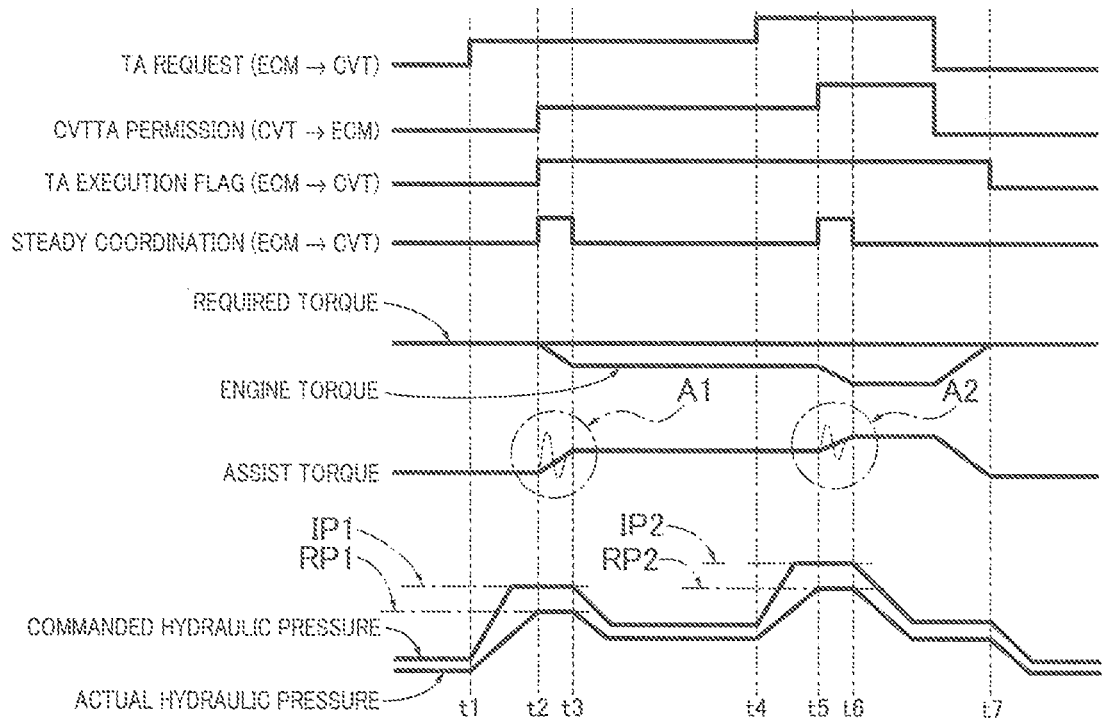
FIG. 7 is a time chart showing each characteristic when torque assist coordination control in which a torque assist level is shifted in the order of zero→small→large→zero is carried out in a comparative embodiment.

In the comparative embodiment, when the torque assist level is shifted in the order of zero→small→large→zero, as shown in FIG. 7, it is expected that assist torque overshoot occurs in the part surrounded by an arrow A1 and the part surrounded by an arrow A2 in each of which the increasing of the assist torque is started. Therefore, the commanded hydraulic pressure on the CVT side is increased in the sections between a time t1 and a time t3 and between a time t4 and a time t6 in each of which the overshoot is expected. At this time, in the increasing of the commanded hydraulic pressure in the section between the time t1 and the time t3, the commanded hydraulic pressure is increased to a target initial value IP1 and the actual hydraulic pressure is increased to RP1. In the increasing of the commanded hydraulic pressure in the section between the time t4 and the time t6, the commanded hydraulic pressure is increased to a target initial value IP2 and the actual hydraulic pressure is increased to RP2.

Figure 8:
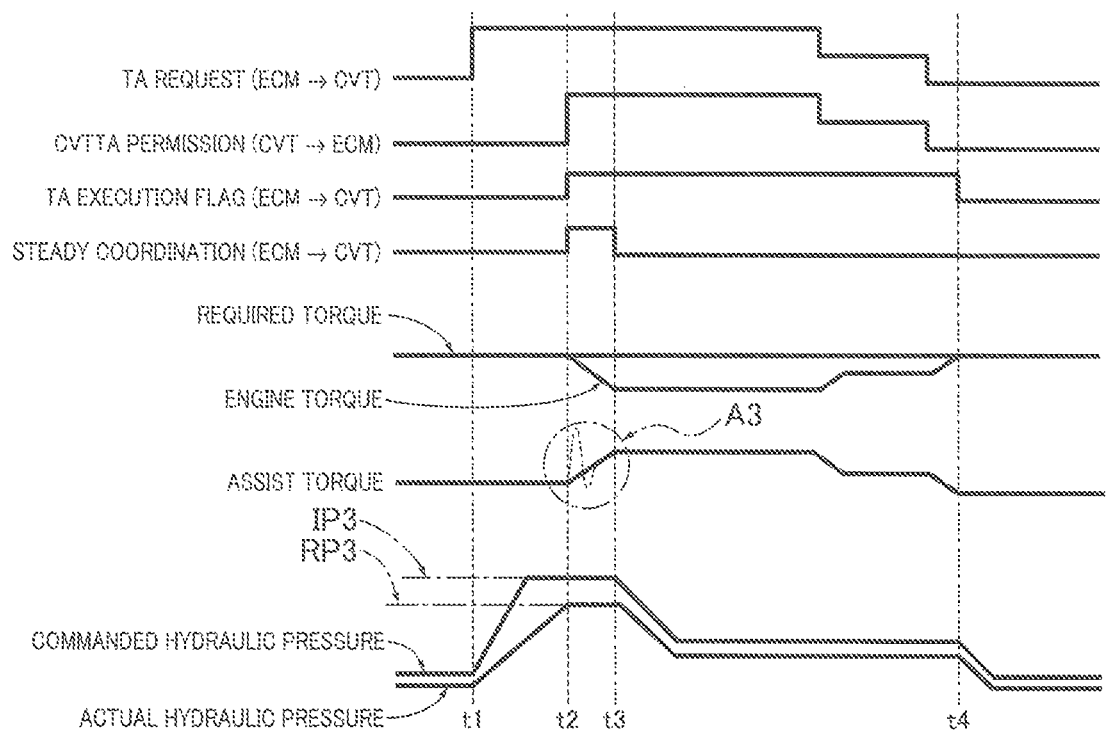
FIG. 8 is a time chart showing each characteristic when a torque assist coordination control in which a torque assist level is shifted in the order of zero→large→small→zero is carried out in a comparative embodiment.

In the comparative embodiment, in a case where the torque assist level is shifted in the order of zero→large→small→zero, as shown in FIG. 8, the occurrence of torque overshoot is expected in the part surrounded by an arrow A3 in which the increasing of the assist torque is started. Therefore, the commanded hydraulic pressure on the CVT side is increased in the section between the time t1 and the time t3 in which the overshoot is expected. At this time, in the increasing of the commanded hydraulic pressure in the section between the time t1 and the time t3, the commanded hydraulic pressure is increased to a target initial value IP3, and the actual pressure is increased to RP3.

In this way, since there are two types of large and small torque assists, it is necessary to set a target initial value for increasing the commanded hydraulic pressure in accordance with three types of the switching patterns (1), (4) and (2) into three different types of the target initial value IP1, the target initial value IP2 and the target initial value IP3. That is, on the CVT side, it is necessary to determine whether a switching pattern is the witching pattern (1), the switching pattern (4) or the switching pattern (2), and, after determining the switching pattern, the control for changing the output characteristic for increasing the commanded hydraulic pressure in every of the switching patterns (1), (4) and (2) is carried out.

Consequently, there is a problem that, even in a switching state of the same motor torque and engine torque, if the number of types of the torque assist is increased, since the number of switching patterns of the torque assist levels which has to be considered is increased, control logic becomes complicated. In particular, the more the number of the types of the torque assist is increased, the more the number of the switching patterns of the torque assist levels in combination is increased at an accelerating rate.

Means for Solving the Problem and Problem Solving Action

In the present invention, focusing on the above problem, a plurality of types of switching patterns on the torque assist control side of an assist motor 10 are treated as one torque assist request on the torque assist coordination control side of a belt type continuously variable transmission CVT. A CVT control unit 8 includes a torque assist coordination control unit 8a for carrying out the control that increases commanded hydraulic pressure so as to increase the hydraulic pressure of hydraulically operated members existing in a torque transmission path, when a torque assist request is input from a torque assist control unit 9a. The torque assist coordination control unit 8a is configured to unify commanded hydraulic pressure levels (the levels of commanded hydraulic pressure increase accompanying the torque assist) regardless of the type of a torque assist request to be input, in a case where the control that increases the commanded hydraulic pressure is carried out.

In this way, a plurality of types of the switching patterns on the torque assist control side are treated as one torque assist request on the torque assist coordination control side. Consequently, it is not necessary to determine whether the torque assist request is based on any of types of the switching patterns. In addition, in a case where the control that increases the commanded hydraulic pressure is carried out, the levels of the commanded hydraulic pressure are unified regardless of the type of a torque assist request to be input. Therefore, it is not necessary to carry out the control for changing the levels of the commanded hydraulic pressure in every of the switching patterns.

Consequently, when the coordination control of transmission hydraulic control and the torque assist control by the assist motor 10 is carried out, the control logic on the transmission hydraulic control side can be simplified. In addition, in the torque assist control unit 9a, the performance of the control for the assist motor 10 via a plurality of types of the switching patterns having different torque assist levels is permitted. Therefore, when engine torque alone is not sufficient as driving source torque at the time of the start of a vehicle or sudden acceleration, the torque assist control that finely responds to a torque assist request according to the deviation of required torque and the engine torque can be carried out.

[Torque Assist Coordination Control Action]

First, based on the flowchart of FIG. 6, a torque assist coordination control action will be explained. When a torque assist request is made, in the flowchart of FIG. 6, the process proceeds in the order of S1→S2→S3, and while it is determined that commanded hydraulic pressure does not reach a target initial value, the flow of S2→S3 is repeated. That is, when a torque assist request is made, the control that increases the commanded hydraulic pressure at an increasing gradient +θ is started, and the increasing of the commanded hydraulic pressure is continued until reaching the target initial value.

In the step S3, when it is determined that the commanded hydraulic pressure reaches the target initial value, the process proceeds from the step S in the order of S4→S5, and while it is determined that an actual hydraulic pressure does not reach a target hydraulic pressure in the step S5, the flow of S4→S5 is repeated. That is, when the commanded hydraulic pressure is increased and reaches the target initial value, the commanded hydraulic pressure is maintained at the target initial value until the actual hydraulic pressure reaches the target hydraulic pressure.

When it is determined that the actual hydraulic pressure reaches the target hydraulic pressure in the step S5, the process proceeds from the step S5 in the order of S6→S7, and while it is determined that assist torque does not reach a target torque in the step S7, the determination of the step S7 is repeated. That is, when it is determined that the actual hydraulic pressure reaches the target hydraulic pressure, in the step S6, a torque assist permission command is output to the torque assist control unit 9a of the engine control module 9 via the CAN communication line 13. With this, in the torque assist control unit 9a, torque assist control by the assist motor is started.

When it is determined that the assist torque by the assist motor reaches the target torque in the step S7, the process proceeds from the step S7 in the order of S8→S9, and while it is determined that the commanded hydraulic pressure does not reach a target steady-state value in the step S9, the flow of S8→S9 is repeated. That is, when it is determined that the assist torque reaches the target torque, in the step S8, the control that decreases the commanded hydraulic pressure at a decreasing gradient −θ is started, and the decreasing of the commanded hydraulic pressure is continued until reaching the target steady-state value.

When it is determined that the commanded hydraulic pressure reaches the target steady-state value in the step S9, the process proceeds from the step S9 in the order of S10→S11→S12. In the step S10, the commanded hydraulic pressure is maintained at the target steady-state value until a new assist request is made or the torque assist request becomes zero (torque assist request=0). In the step S11, it is determined whether or not no torque assist request is made, and when it is determined that no torque assist request is made, the process proceeds to the step S12. On the other hand, when it is determined that no torque assist is not made, the process is returned to the step S2, and based on a new torque assist request, the processing from the S2 to S10 is carried out. In the step S12, it is determined whether or not the torque assist request is zero, and when it is determined that the torque assist is not zero, the process is returned to the step S10 and the hydraulic pressure is maintained at the target steady-state value, and the determination of the step S11 and the step S12 is continued.

When it is determined that the torque assist request is zero (torque assist request=0) in the step S12, the process proceeds from S12 in the order of S13→S14, and while it determined that the assist torque is greater than zero (assist torque>0) in the step S14, the flow of S13→S14 is repeated. That is, when it is determined that the torque assist request is zero (torque assist request=0), in the step S13, the command for lowering the assist torque by the assist motor 10 so as to be zero is output to the torque assist control unit 9a via the CAN communication line 13.

When it is determined that the assist torque is zero (assist torque=0) in the step S14, the process proceeds from the step S14 in the order of S15→S16→S17, and while it is determined that the increased amount of the commanded hydraulic pressure is greater than zero (the increased amount of the commanded hydraulic pressure>0) in the step S17, the flow of S16→S17 is repeated. That is, in the step S15, a torque assist stop command is output, via the CAN communication line 13, to the torque assist control unit 9a of the engine control module 9. In the next step S16, the control that decreases the increased amount of the commanded hydraulic pressure so as to be zero is carried out. When it is determined that the increased amount of the commanded hydraulic pressure is zero (commanded hydraulic pressure=0) in the step S17, the torque assist coordination control is ended, and the process proceeds from the step S17 to the return.

Figure 9:
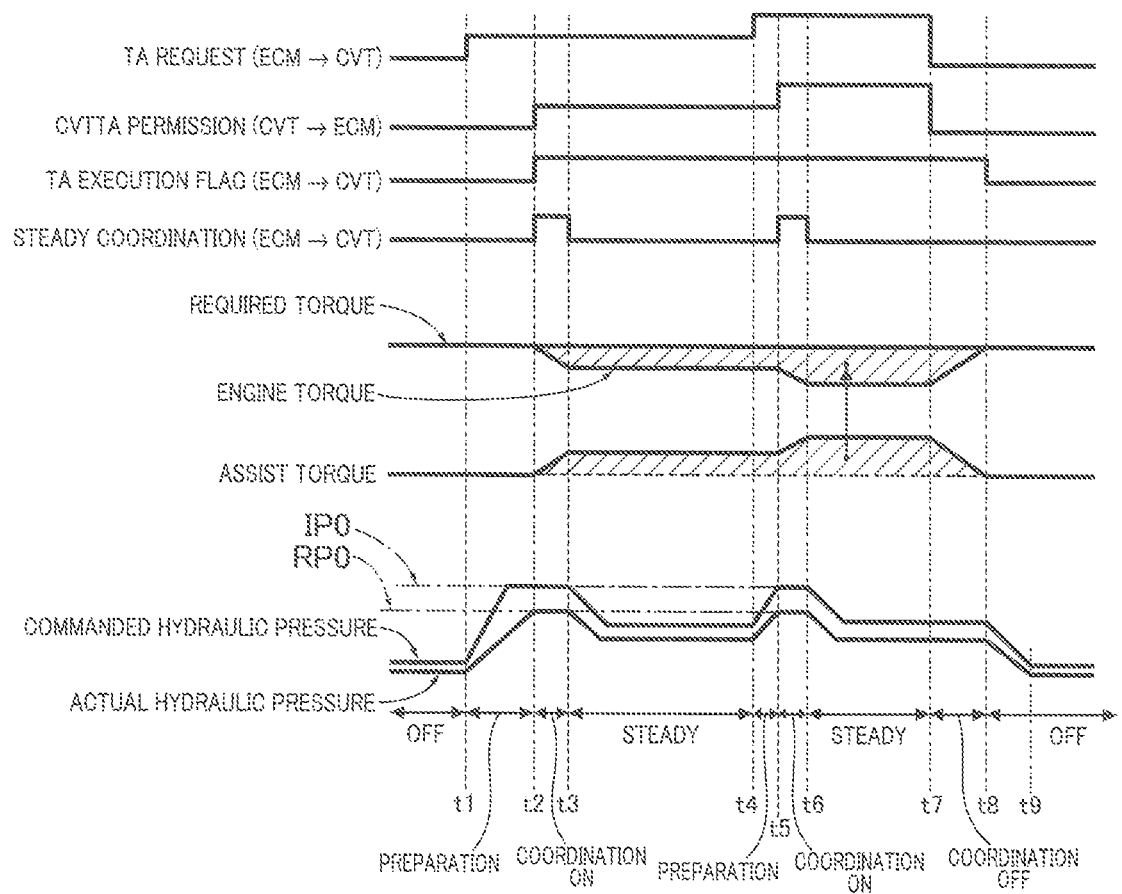
FIG. 9 is a time chart showing each characteristic when torque assist coordination control in which a torque assist level is shifted in the order of zero→small→large→zero is carried out in the embodiment.

Next, based on FIG. 9, a torque assist coordination control action when a request for a torque assist level is shifted in the order of zero→small→large→zero will be explained.

when the torque assist level is shifted in the order of zero→small at a time t1, as shown in FIG. 9, it is expected that the overshoot of the assist torque occurs at a time t2 in which the increasing of the assist torque is started. Therefore, it is necessary to increase the commanded hydraulic pressure on the CVT side in the section between the time t1 and a time t3 in which the occurrence of the overshoot is expected. At this time, in the increasing of the commanded hydraulic pressure in the section between the time t1 and the time t3, the hydraulic pressure is increased to a target initial value IP0 and the actual hydraulic pressure is increased to RP0.

When the torque assist level is shifted in the order of small→large at a time t4, as shown in FIG. 9, it is expected that the overshoot of the assist torque occurs at a time t5 in which the increasing of the assist torque is started. Therefore, it is necessary to increase the commanded hydraulic pressure on the CVT side in the section between the time t4 and a time t6 in which the occurrence of the overshoot is expected. At this time, in the increasing of the commanded hydraulic pressure in the section between the time t4 and the time t6, the hydraulic pressure is increased to the target initial value IP0, and the actual hydraulic pressure is increased to RP0.

In this way, in the torque assist coordination control when the torque assist level is shifted in the order of zero→small-→large→zero in the section between the time t2 and a time t8, the assist torque is generated by the assist motor 10. Consequently, the torque shortage amount of the engine torque to a required torque is supplemented by the assist torque in the section between the time t2 and the time t8. Then, although the commanded hydraulic pressure is increased between the time t1 and the time t3 and between the time t4 and the time t6 to suppress belt slipping or clutch slipping which is expected to occur, in either case, the commanded hydraulic pressure is increased to the same target initial value IP0.

Next, based on FIG. 10, a torque assist coordination action when a request for a torque assist level is shifted in the order of large→zero after being shifted in the order of zero→small→large in a preparation section will be explained.

Figure 10:
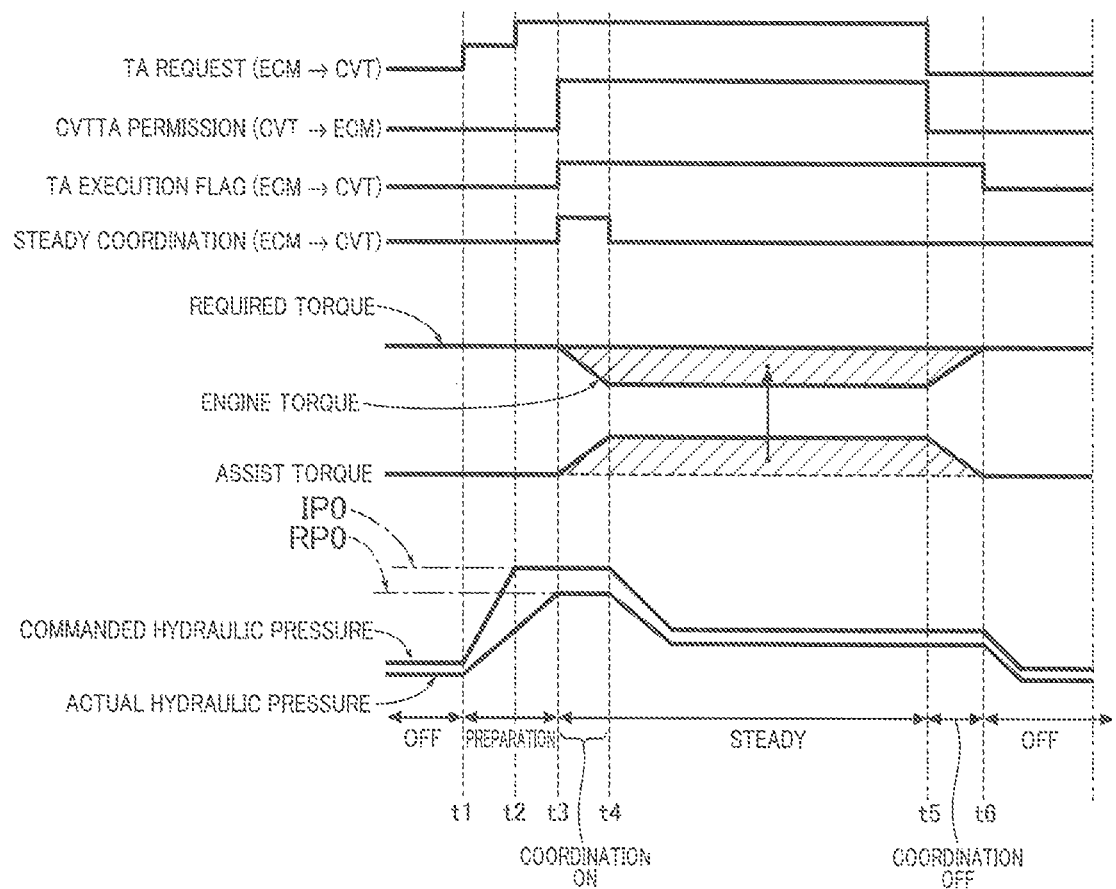
FIG. 10 is a time chart showing each characteristic when torque assist coordination control is carried out in the embodiment, and in this torque assist coordination control, a torque assist level in a preparation section is shifted in the order of zero→small→large, following which it is shifted in this order of large→zero.

When the torque assist level is shifted in the order of zero→small at a time t1, and then is shifted in the order of small→large at a time t2, as shown in FIG. 10, it is expected that the overshoot of the assist torque occurs at a time t3 at which the increasing of the assist torque is started. In contrast to this, even if the torque assist is shifted in the order of small→large at the time t2, it is regarded as "preparation", and a torque assist request is ignored. Therefore, the commanded hydraulic pressure on the CVT side is increased in the section between the time t1 and the time t4 in which the overshoot is expected to occur. At this time, in the increasing of the commanded hydraulic pressure in the section between the time t1 and the time t4, the commanded hydraulic pressure is increased to the target initial value IP0, and the actual hydraulic pressure is increased to RP0.

In this way, in the torque assist coordination control when the torque assist level is shifted in the order of large→zero after being shifted in the order of zero→small→large→, assist torque is generated by the assist motor 10 in the section between the time t3 and the time t6. Consequently, the torque shortage amount of the engine torque to a required torque is supplemented by the assist torque in the section between the time t3 and the time t6. Then, although the commanded hydraulic pressure is increased between the time t1 and the time t4 to suppress belt slipping or clutch slipping which is expected to occur, similar to the case of FIG. 9, the commanded hydraulic pressure is increased to the same target initial value IP0.

As explained above, in the hydraulic control device for the belt type continuously variable transmission CVT of the embodiment, the following effects can be obtained.

(1) A hydraulic control device for an automatic transmission includes:
a driving source including an engine 1 and an assist motor 10;
an automatic transmission (belt type continuously variable transmission CVT) interposed between the driving source and a drive wheel 6;
a driving source controller (engine control module 9) for controlling the engine 1 and the assist motor 10; and
a transmission controller (CVT control unit 8) for controlling hydraulic pressure of hydraulically operated members included in the automatic transmission (belt type continuously variable transmission CVT),
wherein the driving source controller (engine control module 9) includes a torque assist control unit 9a for controlling the assist motor via a plurality of types of switching patterns having different torque assist levels,
wherein the transmission controller (CVT control unit 8) includes a torque assist coordination control unit 8a for carrying out control that, when a torque assist request is input from the torque assist control unit 9a, increases commanded hydraulic pressure so as to increase the hydraulic pressure of the hydraulically operated members existing in a torque transmission path, and
wherein when the control that increases the commanded hydraulic pressure is carried out, the torque assist coordination control unit 8a unifies levels of the commanded hydraulic pressure regardless of the type of a torque assist request to be input.

Consequently, when the coordination control of the transmission hydraulic control and the torque assist control by the assist motor 10 is carried out, the control logic on the transmission hydraulic control side can be simplified.

(2) When unifying the levels of the commanded hydraulic pressure, the torque assist coordination control unit 8a unifies the levels of the commanded hydraulic pressure into a highest commanded hydraulic pressure level of the levels of the commanded hydraulic pressure which are set to different levels according to a plurality of respective torque assist levels.

Consequently, when the torque assist coordination control is carried out, while unifying the levels of the commanded hydraulic pressure, the slipping of hydraulically operated members included in the automatic transmission (belt type continuously variable transmission CVT) can be surely suppressed.

(3) When unifying the levels of the commanded hydraulic pressure, the torque assist coordination control unit 8a sets a target initial value of the commanded hydraulic pressure to a value higher than a target steady-state value of the commanded hydraulic pressure, sets each of levels of the target initial value and the target steady-state value as a fixed value, and unifies a commanded hydraulic pressure output characteristic until the commanded hydraulic pressure is maintained after the commanded hydraulic pressure is increased.

Consequently, when the torque assist coordination control is carried out, the commanded hydraulic pressure can be output with the unified characteristic regardless of the type of a torque assist request. In addition, by setting the target initial value of the commanded value to a value higher than the target steady-state value, the responsiveness of the actual hydraulic pressure of the hydraulically operated members existing in the torque transmission path is enhanced, and the slipping of the hydraulically operated members can be suppressed.

(4) The torque assist coordination control unit 8a sets a section until an actual hydraulic pressure reaches a target hydraulic pressure after output for increasing the commanded hydraulic pressure is started as a preparation section, and
without inputting a new torque assist request in a middle of the preparation section, output of the commanded hydraulic pressure with a characteristic unified based on input of a first torque assist request is maintained.

Consequently, when a new torque assist request is input in the middle of the preparation section, without changing the output of the commanded hydraulic pressure, the torque assist coordination control can be carried out.

That is, when the torque assist coordination control is carried out, a unified commanded hydraulic pressure output characteristic is used regardless of the type of a torque assist request. Therefore, even if a plurality of torque assist requests are made in the preparation section, it is possible to respond to it by overlapping the same commanded hydraulic pressure output characteristic.

(5) The torque assist control unit 9a is provided with two types of torque assist levels of a small torque assist level and a large torque assist level, and carries out torque assist control via three types of switching patterns having different torque change ranges of no torque assist→small torque assist, no torque assist→large torque assist and small torque assist→large torque assist.

Consequently, while simplifying the control logic on the transmission hydraulic control side, when the engine torque is shortage with respect to required torque, the torque assist control can be carried out that supplements the torque shortage amount of the engine torque to the required torque by three types of switching patterns having different assist torque change ranges.

As the above, the hydraulic control device for the automatic transmission of the present invention has been explained based on the embodiment. However, a specific configuration is not limited to the embodiment, and design change and addition can be permitted without departing from the gist of the present invention according to the claims within the scope of claims.

In the embodiment, as an example of the torque assist coordination unit 8a, one has been shown in which the levels of the commanded hydraulic pressure to the line pressure solenoid valve 72 are unified regardless of the type of a torque assist request to be input, in a case where the control for increasing the hydraulic pressure is carried out. As an example of the torque assist coordination control unit, one may be available in which, in a case where a line pressure is sufficiently high, the hydraulic pressure of the hydraulically operated members (lock-up clutch, forward clutch, primary pulley and secondary pulley) existing in the torque transmission path is increased by respective solenoid valves.

In the present embodiment, as an example of the torque assist control unit 9a, one has been shown in which two types of torque assists of a small torque assist and a large torque assist are provided, and the torque assist control is carried out via three types of switching patterns having different torque change ranges. However, as an example of the torque assist control unit, one may be available in which two or more types of torque assists are provided, and the torque assist control is carried out via a plurality of types of switching patterns having different toque change ranges.

In the embodiment, an example has been shown that the torque assist control unit 9a is included in the engine control module 9. However, as an example, the torque assist control unit may be included as a torque assist controller separately from the engine control module. In this case, the engine control module and the torque assist controller are connected to each other by a CAN communication line.

In the embodiment, an example has been shown that the hydraulic control device of the present invention is applied to an engine vehicle mounting a belt type continuously variable transmission CVT as an automatic transmission. However, the hydraulic control device of the present invention may be applied to a vehicle mounting, as an automatic transmission, a continuously variable transmission with an auxiliary transmission or a vehicle mounting, as an automatic transmission, a stepped variable transmission called as a step AT. In addition, a vehicle to which the hydraulic control device of the present invention is applied is not limited to an engine vehicle mounting an assist motor, and the hydraulic control device of the present invention can be applied to a hybrid vehicle mounting an engine and a motor as a driving source for traveling.

The present application claims a priority of Japanese Patent Application No. 2018-168571 filed with the Japan Patent Office on Sep. 10, 2018, all the contents of which are hereby incorporated by reference.

The invention claimed is:

1. A hydraulic control device for an automatic transmission, comprising:
    a driving source including an engine and an assist motor;
    an automatic transmission interposed between the driving source and a drive wheel;
    a driving source controller for controlling the engine and the assist motor; and
    a transmission controller for controlling hydraulic pressure of hydraulically operated members included in the automatic transmission,
    wherein the driving source controller includes a torque assist control unit for controlling the assist motor via a plurality of types of switching patterns having different torque assist levels,
    wherein the transmission controller includes a torque assist coordination control unit for carrying out control that, when a torque assist request is input from the torque assist control unit, increases commanded hydraulic pressure so as to increase the hydraulic pressure of the hydraulically operated members existing in a torque transmission path,
    wherein when the control that increases the commanded hydraulic pressure is carried out, the torque assist coordination control unit unifies levels of the commanded hydraulic pressure regardless of the types of the switching patterns, sets a target initial value of the commanded hydraulic pressure to a value higher than a target steady-state value of the commanded hydraulic pressure, and sets each of the target initial value and the target steady-state value as a fixed value.

2. The hydraulic control device for the automatic transmission according to claim 1, wherein when unifying the levels of the commanded hydraulic pressure, the torque assist coordination control unit unifies the levels of the commanded hydraulic pressure into a highest commanded hydraulic pressure level of the levels of the commanded hydraulic pressure which are set to different levels according to a plurality of respective torque assist levels.

3. The hydraulic control device for the automatic transmission according to claim 2, wherein a commanded hydraulic pressure output characteristic until the commanded hydraulic pressure is maintained after the commanded hydraulic pressure is increased is unified.

4. The hydraulic control device for the automatic transmission according to claim 3, wherein the torque assist coordination control unit sets a section until an actual hydraulic pressure reaches a target hydraulic pressure after output for increasing the commanded hydraulic pressure is started as a preparation section, and
    wherein, without inputting a new torque assist request in a middle of the preparation section, output of the commanded hydraulic pressure with a characteristic unified based on input of a first torque assist request is maintained.

5. The hydraulic control device for the automatic transmission according to claim 1, wherein the torque assist control unit is provided with two types of torque assist levels of a small torque assist level and a large torque assist level, and carries out torque assist control via three types of switching patterns having different torque change ranges of no torque assist→small torque assist, no torque assist→large torque assist and small torque assist→large torque assist.

6. A hydraulic control method for an automatic transmission, wherein a driving source including an engine and an assist motor, and an automatic transmission interposed between the driving source and a drive wheel are provided, the hydraulic control method comprising:
    controlling the assist motor via a plurality of types of switching patterns having different torque assist levels when engine torque is shortage;
    increasing commanded hydraulic pressure so as to increase hydraulic pressure of hydraulically operated members included in the transmission, in accordance with a torque assist request; and unifying levels of the commanded hydraulic pressure regardless of the types of the switching patterns, when control that increases the commanded hydraulic pressure with respect to the torque assist request is carried out, setting a target initial value of the commanded hydraulic pressure to a value higher than a target steady-state value of the commanded hydraulic pressure, and setting each of the target initial value and the target steady-state value as a fixed value.

7. The hydraulic control method for the automatic transmission according to claim 6, wherein the levels of the commanded hydraulic pressure is unified into a highest commanded hydraulic pressure level of the levels of the commanded hydraulic pressure which are set to different levels according to a plurality of respective torque assist levels.

* * * * *